Patented Apr. 12, 1938

2,113,808

UNITED STATES PATENT OFFICE 2,113,808

METHOD OF REFINING AND HYDROGENATING ROSIN AND PRODUCT THEREOF

Irvin W. Humphrey, Wilmington, Del., assignor to Hercules Powder Company, Wilmington, Del., a corporation of Delaware No Drawing. Application June 20, 1935, Serial No. 27,579

31 Claims.  (Cl. 87—2)

This invention relates to a method for refining and hydrogenating rosin and to product thereof.

The method in accordance with this invention is applicable to rosins generally and is effective for the hydrogenation of unsaturated rosin acids, such as abietic acid, pyroabietic acid, pimaric acid, etc. and to the refining of rosins, more particularly, for improvement of color and in certain cases for reducing the deleterious effects of color bodies.

The method in accordance with this invention will be adaptable for the hydrogenating and refining of gum rosin, such as is obtained from living pine trees and also to the hydrogenation and refinement of wood rosin, such as is obtained by extraction from dead pine stump wood, down wood, and the like. The method in accordance with this invention will be effective to produce a high degree of saturation with hydrogen of the unsaturated rosin acids contained in rosins and, at the same time, will be effective to improve the color of rosins by combination of hydrogen with visible color bodies contained by rosins.

More particularly, where the method is applied to the treatment of wood rosin, which is known to often contain certain color bodies generally termed latent color bodies, which are normally invisible, but which darken under certain conditions, as when exposed to air in the presence of an alkali, as where the rosin is made into a sodium soap, particular advantage will be obtained in that not only will the visible color of the rosin be improved, but any latent color bodies will be combined with hydrogen and their darkening under certain conditions will be inhibited.

Prior to the concepts comprising this invention various attempts have been made to hydrogenate rosins. Thus, for example, the patent to Ellis No. 1,249,050, dated December 4, 1917, discloses an alleged method of effecting the hydrogenation of rosin by treatment of rosin with hydrogen in the presence of a nickel catalyst under about 10 pounds pressure. Again, the patent to Brooks No. 1,167,264, dated January 4, 1916, discloses a method of hydrogenating rosin by the treatment of rosin with hydrogen in the presence of a catalyst, indicated as nickel, or the like, or palladium, or the like. Both of these patents evidently refer to the treatment of gum rosin, since at the time of filing of the application therefor, wood rosin was little known. The Brooks patent in distinction from the Ellis patent, does not disclose procedure involving the use of any specific superatmospheric hydrogen pressure and neither makes nor suggests any distinction between noble metal catalysts, such as palladium, and base metal catalysts, such as nickel as regards the necessity for employing high pressure where a base metal catalyst is used. The Ellis patent does not disclose the use of any pressure in excess of 10 pounds, and Brooks does not suggest any specific pressure.

The specific methods described by the Brooks and Ellis patents referred to are of no practical value whatever when using either base metal or noble catalysts and made no impression on the art.

Now in accordance with this invention it was found that rosins generally could be hydrogenated to a high degree of saturation of the rosin acids, say, for example, saturation of 50%–95% of the theoretical for the two double bonds of an unsaturated rosin acid, as abietic, rendering them adaptable and highly advantageous for various commercial uses, such as in the production of hydrogenated esters, for use as ingredients in gloss oils, ingredients in varnishes, etc., and in soap making. Further, it was found in accordance with this invention that, by hydrogenation, wood rosin containing not only visible but latent color bodies could be refined to a high degree with reference not only to a lightening of its color, but also to a decreasing of the deleterious effect of the presence of latent color bodies.

The method in accordance with this invention comprises essentially treatment of a rosin, comprising chiefly, for example, abietic acid, pyroabietic acid, pimaric acid, or the like, or mixtures thereof and small proportions of resenes, color bodies and other components, as oxidized resin acids which can be hydrogenated, with hydrogen in the presence of a base metal hydrogenation catalyst, as nickel, cobalt, etc., or activated mixtures thereof, as nickel-cobalt, nickel-copper, etc. under high hydrogen pressure and at an elevated temperature.

More specifically, the method in accordance with this invention involves the treatment of a rosin with hydrogen in the presence of an activated base metal hydrogenation catalyst under a pressure within the range 200–15,000 pounds per square inch and at a temperature within the range of about 125° C. to about 225° C. Procedure under a pressure of less than 200 pounds per square inch will not be productive of any effective reduction in the unsaturation of the double bonds of the rosin acid and it will be essential that the contact of the rosin with hydrogen and the base metal catalyst be carried out under a hydrogen pressure within the range 200–

15,000 pounds, or within the narrower range about 1,000-8,000 pounds, and generally, in the average case, the treatment will be carried out under a pressure within the range about 2,000-5,000 pounds.

The method in accordance with this invention will, as has been indicated, involve contacting of the rosin with an activated base metal hydrogenation catalyst and with hydrogen under a pressure within the limits given and also at an elevated temperature within the range about 125° C. to about 225° C. The requisite time of treatment will depend to an extent upon conditions such as pressure, particular rosin treated, temperature of contacting the reagents, degree of activity of catalyst and the extent of hydrogenation desired. However, proceeding within the limits of temperature and pressure essential in accordance with this invention, the time of treatment will range from about 0.5 to about 5.0 hours and generally within the range from about 1.0 to about 2.0 hours.

The product in accordance with this invention will be radically distinguished from any products known prior to the concept thereof where wood rosin is treated or where a previously refined wood or gum rosin is treated, by the fact that it will comprise a rosin, the double bonds of the rosin acid of which, as abietic acid, pyroabietic acid, pimaric acid, and the like, will be saturated with hydrogen to at least 50% of theoretical and desirably to an extent of about 60%-95%, and generally within about the range 65%-85%. The high saturation with hydrogen characteristic of products in accordance with this invention will be a direct result of the procedure for effecting hydrogenation of rosins in accordance with this invention and in particular of the procedure in the presence of a base metal hydrogenation catalyst under the essential pressure conditions indicated.

The product in accordance with this invention will be further characterized by the fact that most of the visible color bodies of the rosin will be converted into color body-hydrogen combination products, which will be substantially colorless, and as a consequence the hydrogenated rosin, the product of this invention, will be distinguished by improved or lessened color. Further and more particularly where the product in accordance with this invention is produced through treatment of wood rosin by the method embodying this invention, it will be distinguished not only by a high degree of saturation with hydrogen of the rosin acid and conversion of visible color bodies into colorless products, but by the fact that any latent color bodies normally contained by wood rosin will have been converted into latent color body-hydrogen combination products and the deleterious effect normally found from the presence of latent color bodies will be largely inhibited.

In proceeding for the carrying out of the method in accordance with this invention for the production of products in accordance therewith, rosins as such, comprising largely abietic, pimaric, and the like, rosin acids, or mixtures thereof and resenes and also including appreciable amounts of visible color bodies, oxidized resin acids, and, in the case of wood rosin, also of latent color bodies, etc., and other ingredients found normally in rosins, such as wood and gum rosin, may be treated directly. Again, the rosin may first be subjected to a refining treatment, such as distillation under reduced pressure, say 5-30 mm. mercury, under reduced pressure with the injection of steam or inert gas, extraction with a selective color body solvent, as furfural, filtration, as through fuller's earth, activated carbon, or the like, or otherwise, for the removal to a greater or less degree of various impurities, as color bodies, visible and latent, oxidized resin acids, etc., normally contained by rosins variously. Again, the rosin before treatment with hydrogen by the procedure in accordance with this invention, may be subjected to distillation under vacuum for the removal of light ends with treatment of the residue or an intermediate fraction in accordance with this invention. Likewise, if desired, the rosin, after treatment with hydrogen by the procedure in accordance with this invention, may be subjected to distillation under a reduced pressure, say 5-30 mm. mercury, or under reduced pressure with injection of steam or inert gas, and a hydrogenated fraction or fractions collected, and a hydrogenated residue obtained or refined with a selective solvent for color bodies, as furfural, phenol, etc., crystallization from alcohol, etc.

The exact procedure precedent to or following the treatment of rosins with hydrogen will be selected with reference to the particular characteristics desired for the hydrogenated product. Thus, for example, where maximum lightness of visible color and, where present in the original rosin, a maximum modification in latent color bodies, as such, is desired, the rosin will desirably be given a refining treatment, as by selective solvent extraction with furfural, phenol, etc., crystallization from alcohol, or the like, before treatment with hydrogen, under pressure in the presence of a base metal hydrogenation catalyst, which under such circumstances will not only effect the high degree of saturation of the rosin acids indicated, but will also effectively convert residual visible, and, if present, latent color bodies.

Where a hydrogenated product of increased melting point is desired, distillation of the rosin under reduced pressure for the removal of low ends, may be accomplished before the treatment with hydrogen. Thus, for example, where a product of increased melting point is desired, the original rosin may be first distilled under a pressure of 5-30 mm. mercury until about 5-15% of the original rosin has been distilled of. and the residue then subjected to treatment with hydrogen or the distillation continued or one or more cuts collected and subjected to hydrogenation, as previously described.

Further, where products having particular characteristics as, for example, melting point, purity, or the like, are desired, the original rosin may be fractionated, as by distillation under reduced pressure, treatment with a selective color body solvent, as furfural, phenol, etc., or by crystallization from a solvent, as methanol, acetone, ethyl alcohol, etc., and any desired or selected fraction or fractions subjected to treatment with hydrogen. Where a product of high purity is desired, as has been indicated, the rosin product after treatment with hydrogen, may be subjected to fractionation, as by distillation under reduced pressure, treatment with a selective color body solvent, as furfural, phenol, etc., or by crystallization from a solvent, as methanol, acetone, ethyl alcohol, etc. for the production of a hydrogenated fraction or fractions having desired characteristics, or the hydrogenated product may be subjected to a refining treatment in solution with activated carbon, fuller's earth, or the like, or extraction in solution in a suitable solvent with a selective color body solvent, as furfural, etc., which is substantially immiscible with the rosin solvent, as gasoline, which refining procedure will be facilitated by virtue of the conversion of visible and, where present, latent color bodies, into color body-hydrogen products.

For procedure in accordance with the method embodying this invention any suitable base metal hydrogenation catalyst, such as nickel, cobalt, etc., and activated mixtures thereof, as copper-nickel, nickel-cobalt, etc., supported or unsupported and prepared by any well known method, in an activated state may be used. The base metal catalyst will be used in suitable form or suitably supported. Thus, for example, the base metal hydrogenation catalysts, pure or admixed with their oxides, may be agitated in finely divided state in admixture with hydrogen under pressure and the rosin under treatment, or the base metal catalyst may be supported on any suitable support, such as pumice, kieselguhr, or the like. The rosin for treatment will be in a fluid state, to which it may be brought by the application of suitable temperature, or where hydrogenation is effected at a temperature below that at which the rosin is desirably fluid, by dissolving it in any suitable solvent, such, for example, as certain petroleum hydrocarbon cuts such as gasoline, light mineral naphtha, etc., a suitable alcohol, as ethyl, or in solution in ether, acetic acid, etc., or other suitable solvent from which the hydrogenated products may be recovered, or the rosin may be rendered fluid by use of both heat and solvent.

As illustrative of practical procedure in accordance with the method embodying this invention for the hydrogenation of wood rosin, as such, or fractionated, or pretreated as indicated above, for example, a quantity of molten rosin is mixed with 2% of active nickel hydrogenation catalyst supported on kieselguhr. Hydrogen is then contacted with the molten rosin for a period of about five hours, the rosin being agitated by shaking the reaction vessel at a temperature of about 200° C. and under a hydrogen pressure of about 200 pounds. During the treatment the molten rosin and catalyst are agitated. On completion of the treatment the catalyst is filtered from the rosin, or separated by dissolving the rosin with a solvent, such as ether and filtering, by distillation under reduced pressure, by combinations of dissolving, filtering and distilling, or in any other convenient manner.

Following the above procedure under the conditions of temperature and pressure indicated and using a highly active nickel hydrogenation catalyst, the rosin will be found to have about 54% saturation with hydrogen required by theory for the double bonds of abietic acid and to be of substantially improved color by virtue of the conversion of visible color bodies into colorless color body-hydrogen combination products. The hydrogenated wood rosin product will, unless it were very thoroughly refined prior to hydrogenation, contain latent color body-hydrogen combination products.

As more specifically illustrative of the product, assuming the original material to have been a refined wood rosin having, for example, an iodine number (Hanus method) of 290, a thiocyanate value of about 80, a melting point (drop method) of about 80° C., an acid number of about 165 and grading I in color, the product will have an iodine number (Hanus method) of about 216, a thiocyanate value of about 33, a melting point of 77.5° C., an acid number of about 161 and will grade N in color.

From the above comparison of characteristics of the original rosin subjected to treatment with similar characteristics of the hydrogenated product, it will be noted that color has been substantially improved and that the melting point has been slightly reduced. As indicated above, the product will show a saturation equal to about 54% of the theoretical for the two double bonds of the abietic acid.

As further specifically illustrative, for example, 200 parts of I grade wood rosin, procured by refining ordinary FF wood rosin with furfural according to the procedure described in U. S. P. No. 1,715,088, is agitated with 2% of an active, suitably supported nickel hydrogenation catalyst at 180–190° C. in an atmosphere of hydrogen under 1800–2200 pounds per sq. in. hydrogen pressure for a period of 1.5 hours. The rosin when filtered from the catalyst will grade N in color and will be saturated to 61% of the theory required for two double bonds. By hydrogenating at 3000–3500 pounds per sq. in. pressure, a saturation of 70%–75% will be attained when using a highly active Ni catalyst. If the catalyst is not of high activity, considerably higher hydrogenation pressures will be required to attain the stated degrees of hydrogenation.

In practical adaptation of the method in accordance with this invention, rosins may be hydrogenated by the procedure described in the above examples with use, however, of increased hydrogen pressures and for periods of about 0.5 to 2.0 hours. Thus, proceeding at temperatures of about 125° C.–225° C. and contacting the rosin in a fluid state with an active base metal hydrogenation catalyst, with the use of hydrogen pressures in excess of 200 pounds, say, for example, pressures within the range 2,000–5,000 pounds per sq. in., the products will be distinguished by hydrogen saturation of about 60% to about 80%, while proceeding with the use of pressures in excess of 5,000 pounds the products will be distinguished by hydrogen saturation up to 95% of theory.

In proceeding in accordance with the above examples and with the use of pressures within the range 200–15,000 pounds per sq. in., indicated as essential, the products will be distinguished by a hydrogen saturation of 50%–95% and also by the presence of color body-hydrogen combination products, which, in the case of visible color body-hydrogen combination products will result in improved color due to the lack of color of such products and, in the case of latent color body-hydrogen products, will result in improved product due to inhibition of the deleterious effects produced by normal latent color bodies.

The conditions given above with reference to pressure, temperature, etc. will be generally applicable to procedure involving the hydrogenation of rosin in solution and the hydrogenated rosin product may, if desired, be distilled under reduced pressure, or otherwise treated as described herein.

The products produced by procedure in accordance with this invention, for example, as illustrated above, may, as has been indicated, be subjected to further treatment, as by distillation, under reduced pressure, fractionation under reduced pressure, extraction with a latent color body solvent, crystallization from alcohol, treatment with activated carbon, fuller's earth, and the like, for the production of products of desired characteristics or improved purity.

Thus, for example, the rosin having been treated with hydrogen under the conditions indicated, may be fractionated under reduced pressure and a fraction or fractions having improved color and desired boiling range characteristics selected. Again, the rosin having been treated with hydrogen, it may be refined by treatment in solution with a selective color body solvent, such as furfural, furfuryl alcohol, liquid sulphur dioxide, ethylene chlorohydrin, a suitable phenol, as ordinary carbolic acid, etc. Thus, for example, a light petroleum distillate solution of the hydrogenated rosin may be refined by shaking the solution with a quantity of furfural, permitting separation of the rosin solution and selective color body solvent and drawing off the rosin solution, as more particularly described, for example, in United States Letters Patent No. 1,715,088, dated May 28, 1929, to Kaiser and Hancock.

The rosin having been treated with hydrogen, subsequent refining of the rosin may also be accomplished by forming a solution of the treated rosin in a suitable solvent, as a light petroleum distillate, and contacting the solution with activated carbon, fuller's earth, or the like, and filtering.

If desired, the rosin before treatment with hydrogen, may be subjected to distillation under any well known conditions for the distillation of a rosin without decomposition thereof, as under reduced pressure, until say about 85% of the rosin is distilled over. The distillate is then subjected to treatment with hydrogen as exemplified above. The advantage gained by distillation under reduced pressure prior to treatment with hydrogen under pressure will be especially noticeable in the case of wood rosin, since the distillate will be largely free from visible color bodies. The product of the treatment of the distillate with hydrogen in accordance with this invention, however, will usually be of improved visible color over that of the distillate and will, in addition to having the high saturation with hydrogen obtainable, contain latent color body-hydrogen combination products. As will be appreciated, rosin before treatment with hydrogen in accordance with this invention, may be first subjected to distillation under vacuum for the removal of light ends and then distilled under reduced pressure for the obtaining of a fraction or of a plurality of fractions, which will then be treated with hydrogen as exemplified above.

Prior to treatment of the rosin with hydrogen, if desired, the rosin may be dissolved in a suitable solvent, as for example, a light petroleum distillate, as gasoline, and the solution extracted by treatment with a latent color body solvent, such as those mentioned above, by, for example, procedure outlined in United States Patent No. 1,715,088 to Kaiser and Hancock. The rosin solution having been separated from the selective color body solvent, an active base metal hydrogenation catalyst, as nickel in powder form, or suitably supported, may be contacted with the solution and the treatment with hydrogen under, for example, 1500 to 4000 pounds per sq. in. pressure and at a temperature of, for example, 150 to 200° C. then carried out, or the refined rosin may first be recovered from the solution and then hydrogenated in molten condition or redissolved in a suitable solvent, as gasoline. The advantage of such procedure will be especially noticeable in the case of wood rosin inasmuch as the treatment with selective color body solvent will not only reduce the content of visible color bodies, but will also reduce any content of latent color bodies in the wood rosin.

The subsequent treatment with hydrogen will not only result in a product of high saturation with hydrogen, but the treatment will be effective to convert residual visible and latent color bodies into color body-hydrogen combination products with the production of a product of substantially higher color grade than obtainable by the mere extraction with a color body solvent.

It follows that, if desired, rosin prior to treatment with hydrogen may be dissolved in a suitable solvent, as, for example, a light petroleum distillate, and the solution subjected to treatment with activated carbon or fuller's earth, as by contacting with activated carbon or fuller's earth, and filtration.

It will now be appreciated that the method in accordance with this invention involves essentially the treatment of a rosin, as such, or a fraction or residue thereof, or subjected to prior treatment for the removal of impurities, with hydrogen under a pressure of not less than 200 pounds in the presence of an active base metal hydrogenation catalyst, preferably nickel, and that thereby a product having a high saturation, not less than 50% saturation, of the double bonds of the rosin acid is obtained; and further that the rosin is, by the treatment, refined in that visible color bodies contained by the rosin, or residual visible color bodies, if the rosin has been subjected to a refining treatment, are converted into bodies with less color, thus improving the visible color grade of the rosin; and that likewise where the rosin contains latent color bodies, or residual latent color bodies, such are converted into hydrogen combination products and their deleterious effect modified.

The hydrogenated rosin produced in accordance with the method of this invention, aside from its high saturation with hydrogen, i. e. 50%–90% of theory, will be peculiarly characterized where the original rosin comprised wood rosin, by the presence of latent color bodies-hydrogen combination products. Where the original rosin comprised wood or gum rosin which had been previously subjected to a refining treatment, as by distillation under reduced pressure, fractionation under reduced pressure, treatment with a selective solvent for color bodies, or other refining treatment, or where subsequent to hydrogenation the hydrogenated rosin is subjected to distillation under reduced pressure, fractionally distilling under reduced pressure, treatment with a selective color body solvent, or other refining treatment, the hydrogenated rosin product will be characterized by the fact that it will be substantially free from hydrogenated oxidized resin acids, and the hydrogenated rosin product will be very low in petroleum ether and toluene insolubles. Further, the hydrogenated wood rosin produced in accordance with the method of this invention by hydrogenation of previously refined rosin will be characterized by a thiocyanate value (rhodanometric iodine value) within about the range 5–50 as compared with a thiocyanate value within about the range 80–95 for non-hydrogenated rosin. The color of the hydrogenated rosin product will be light and in certain cases may be at least as good, if not better, than that of the WW grade.

It will be appreciated that the product in accordance with this invention will be a rosin, or a fraction, or residue thereof having a saturation with hydrogen of 50% or more, will contain color body-hydrogen combination products, and in the case of incompletely refined wood rosin will also contain latent color body-hydrogen combination products. The product will be adaptable and highly advantageous for a wide variety of commercial uses, such as in the formation of hydrogenated rosin acid esters, as an ingredient of gloss oils, varnishes, etc., for use in the making of soaps, etc.

By way of illustration, for example, rosin after hydrogenation to within about the range of 50%–90% of theory, and preferably supplemented before or after hydrogenation by a refining treatment in the case of wood rosin, as by distillation under reduced pressure, fractionally distilling under reduced pressure, extraction with a selective color body solvent, or otherwise, may be esterified by heating with a polyhydric alcohol, as ethylene glycol, propylene glycol, butylene glycol, glycerol, pentaerythrite, trimethylene glycol, diethylene glycol, triethylene glycol, etc., or esterified by heating with a monohydric alcohol, as methanol, ethyl alcohol, a butyl alcohol, a propyl alcohol, an amyl alcohol, tetrahydro-furfuryl alcohol, borneol, fenchyl alcohol, cyclohexanol, stearol, lauryl, oleyl, hydrogenated abietyl alcohol, also by the monoethyl -methyl or -butyl ethers of ethylene or diethylene glycol, or by other suitable alcohols.

In proceeding in accordance with this invention the rosin may be subjected to a preliminary heat treatment before it is subjected to hydrogenation. Further, rosin having been subjected to hydrogenation the hydrogenated product may be heat treated. Heat treatment, either before or after hydrogenation, may be given irrespective of other treatments, as refining, fractional distillation, etc., to which the rosin or hydrogenated product may be subjected as described herein. Heat treatment of the rosin, either before or after hydrogenation, will generally comprise heating of the rosin or hydrogenated rosin product at a temperature of, for example, from about 275° C. to about 325° C., for a period of, for example, from about 0.2 hour to about 3.0 hours under atmospheric or higher pressure. The heating will desirably be carried out in an inert atmosphere as, for example, an atmosphere of carbon dioxide.

As will be appreciated, the rosin may be heat treated before or after refinement or before or after fractional distillation and then hydrogenated, or the hydrogenated product may be heat treated after hydrogenation and either before or after fractional distillation.

This application is a continuation in part of my application Serial No. 419,748, filed January 9, 1930.

What I claim and desire to protect by Letters Patent is:

1. The method of refining and hydrogenating a rosin, which comprises subjecting a rosin to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

2. The method of refining and hydrogenating a rosin, which comprises subjecting wood rosin to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

3. The method of refining and hydrogenating a rosin, which comprises subjecting a rosin to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

4. The method of refining and hydrogenating a rosin, which comprises subjecting wood rosin to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

5. The method of refining and hydrogenating a rosin, which comprises subjecting a rosin to treatment with hydrogen under a pressure within the range of about 200 to about 15,000 lbs. per sq. in. and at a temperature of about 125° C. to about 225° C. in the presence of an active nickel hydrogenation catalyst until the rosin acid is at least 50% saturated with hydrogen.

6. The method of refining and hydrogenating a rosin, which comprises subjecting wood rosin to treatment with hydrogen under a pressure within the range of about 200 to about 15,000 lbs. per sq. in. and at a temperature of about 125° C. to about 225° C. in the presence of an active nickel hydrogenation catalyst until the rosin acid is at least 50% saturated with hydrogen.

7. The method of refining and hydrogenating a rosin, which comprises distilling off a light end from a rosin and subjecting the residue to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

8. The method of refining and hydrogenating a rosin, which comprises fractionating a rosin and subjecting a fraction of the rosin to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

9. The method of refining and hydrogenating a rosin, which comprises separating color bodies from a rosin acid and subjecting the thus refined rosin to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

10. The method of refining and hydrogenating a rosin, which comprises subjecting a rosin in solution to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

11. The method of refining and hydrogenating a rosin, which comprises subjecting a rosin to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen, and treating the hydrogenated rosin for the separation of color bodies therefrom.

12. The method of refining and hydrogenating a rosin, which comprises subjecting a rosin to treatment with hydrogen under a pressure within the range of about 2,000 to about 5,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

13. The method of refining and hydrogenating rosin which comprises subjecting rosin at an elevated temperature to treatment with hydrogen under a pressure within the range of about 200 to about 15,000 lbs. per sq. in. in the presence of a base metal catalyst until the rosin is at least 50% saturated with hydrogen and then subjecting the hydrogenated rosin to distillation under reduced pressure.

14. A hydrogenated rosin derivative characterized by substantial freedom from hydrogenated oxidized resin acids and by having its unsaturation reduced by at least 50% by hydrogen.

15. A product derived from a refined rosin containing color bodies and comprising a rosin acid the unsaturation of which is reduced at least 50% by hydrogen.

16. A product derived from a refined rosin containing color bodies and comprising a rosin acid the unsaturation of which is reduced at least 50% by hydrogen and a substantially colorless product of the combination of hydrogen with color bodies contained in the rosin.

17. A product derived from wood rosin containing latent color bodies and comprising a rosin acid the unsaturation of which is reduced at least 50% by hydrogen and a product of the combination of hydrogen with latent color bodies contained in the wood rosin.

18. The method of refining and hydrogenating a rosin which comprises heating rosin to an elevated temperature, maintaining the rosin at such temperature without substantial distillation for a substantial period of time, and then subjecting the rosin to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin acid is at least 50% saturated with hydrogen.

19. The method of refining and hydrogenating a rosin which comprises heating rosin to a temperature within the range of about 275° C. to about 325° C., maintaining the rosin at such temperature for from about 0.2 to about 3 hours, and then subjecting the rosin to treatment with hydrogen under a pressure within the range of about 200 to about 15,000 lbs. per sq. in. in the presence of an active base metal hydrogenation catalyst and at an elevated temperature adapted to effect addition of hydrogen to the unsaturated bonds of the rosin acid until the rosin is at least 50% saturated with hydrogen.

20. The method of refining and hydrogenating a rosin which comprises heating rosin to an elevated temperature in an inert atmosphere, maintaining the rosin at such temperature without substantial distillation for a substantial period of time, and then subjecting the rosin to treatment with hydrogen under a pressure within the range of about 200 to about 15,000 lbs. per sq. in. in the presence of an active base metal hydrogenation catalyst until the rosin acid is at least 50% saturated with hydrogen.

21. A product derived from a rosin containing color-bodies and comprising a rosin acid which has been subjected to a hydrogenation treatment by which its unsaturation has been reduced at least 50% by hydrogen, and which has been heat-treated, in a treatment distinct from the said hydrogenation treatment.

22. A product derived from a rosin containing color-bodies which has been subjected to a hydrogenation treatment by which its unsaturation has been reduced at least 50% by hydrogen and which has been heat-treated for a period of from about 0.2 hour to about 3 hours at a temperature within the range of about 275° C. to about 325° C., in a treatment distinct from the said hydrogenation treatment.

23. A hydrogenated rosin, the unsaturation of which has been reduced by at least 50% of theoretical for two double bonds of its unsaturated rosin acids by combination with hydrogen.

24. A hydrogenated wood rosin, the unsaturation of which has been reduced by at least 50% of theoretical for two double bonds of its unsaturated rosin acids by combination with hydrogen.

25. A hydrogenated gum rosin, the unsaturation of which has been reduced by at least 50% of theoretical for two double bonds of its unsaturated rosin acids by combination with hydrogen.

26. The method of hydrogenating a rosin which comprises subjecting a rosin to treatment with hydrogen under a pressure within the range of about 1000 to about 8000 lbs. per sq. in. and at a temperature of about 125° C. to about 225° C. in the presence of an active base metal hydrogenation catalyst until the rosin is at least 50% saturated with hydrogen.

27. The method of refining and hydrogenating a rosin, which comprises subjecting a rosin to treatment with hydrogen under a pressure within the range of about 200 to about 15,000 lbs. per sq. in. and at a temperature within the range of about 180° C. to about 190° C. in the presence of an active base metal hydrogenation catalyst until the rosin acid is at least 50% saturated with hydrogen.

28. A hydrogenated rosin, the unsaturation of which has been reduced to an extent within the range of about 50% to about 95% of theoretical for two double bonds of its unsaturated rosin acids by combination with hydrogen.

29. The method of refining and hydrogenating a rosin which comprises subjecting a rosin in solution in a suitable hydrocarbon solvent to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

30. The method of refining and hydrogenating a rosin which comprises subjecting a rosin in solution in a suitable alcohol to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

31. The method of refining and hydrogenating a rosin which comprises subjecting a rosin in solution to treatment with hydrogen under a pressure within the range of about 200 to about 15,000 lbs. per sq. in. and at a temperature of about 150° C. to about 200° C. in the presence of an active base metal hydrogenation catalyst until the rosin acid is at least 50% saturated with hydrogen.

IRVIN W. HUMPHREY.

CERTIFICATE OF CORRECTION.

Patent No. 2,113,808. April 12, 1938.

IRVIN W. HUMPHREY.

It is hereby certified that error appears in the printed specification of the above numbered patent requiring correction as follows: Page 1, second column, line 11, after "noble" insert the word metal; page 2, second column, line 1, after "mercury," insert or; and that the said Letters Patent should be read with these corrections therein that the same may conform to the record of the case in the Patent Office.

Signed and sealed this 14th day of June, A. D. 1938.

Henry Van Arsdale,
Acting Commissioner of Patents.

(Seal)

treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

30. The method of refining and hydrogenating a rosin which comprises subjecting a rosin in solution in a suitable alcohol to treatment with hydrogen under a pressure within the range of about 200 to about 15,000 lbs. per sq. in. and at a temperature of about 125° C. to about 225° C. in the presence of an active base metal hydrogenation catalyst until the rosin acid is at least 50% saturated with hydrogen.

31. The method of refining and hydrogenating a rosin which comprises subjecting a rosin in solution to treatment with hydrogen under a pressure within the range of about 200 to about 15,000 lbs. per sq. in. and at a temperature of about 150° C. to about 200° C. in the presence of an active base metal hydrogenation catalyst until the rosin acid is at least 50% saturated with hydrogen.

IRVIN W. HUMPHREY.

CERTIFICATE OF CORRECTION.

Patent No. 2,113,808. April 12, 1938.

IRVIN W. HUMPHREY.

It is hereby certified that error appears in the printed specification of the above numbered patent requiring correction as follows: Page 1, second column, line 11, after "noble" insert the word metal; page 2, second column, line 1, after "mercury," insert or; and that the said Letters Patent should be read with these corrections therein that the same may conform to the record of the case in the Patent Office.

Signed and sealed this 14th day of June, A. D. 1938.

Henry Van Arsdale,
Acting Commissioner of Patents.

(Seal)

CERTIFICATE OF CORRECTION.

Patent No. 2,113,808. April 12, 1938.

IRVIN W. HUMPHREY.

It is hereby certified that error appears in the printed specification of the above numbered patent requiring correction as follows: Page 1, second column, line 11, after "noble" insert the word metal; page 2, second column, line 1, after "mercury," insert or; and that the said Letters Patent should be read with these corrections therein that the same may conform to the record of the case in the Patent Office.

Signed and sealed this 14th day of June, A. D. 1938.

(Seal)

Henry Van Arsdale,
Acting Commissioner of Patents.